United States Patent Office 2,742,497
Patented Apr. 17, 1956

2,742,497

RECOVERY OF NAPHTHENIC ACIDS FROM OTHER PETROLEUM CONSTITUENTS

Stanford J. Hetzel, Cheltenham, Pa., assignor to Sun Oil Company, Philadelphia, Pa., a corporation of New Jersey No Drawing. Application December 29, 1951, Serial No. 264,244

5 Claims. (Cl. 260—514)

This invention relates to the recovery of naphthenic acids from petroleum, and more particularly to the preparation of naphthenic acids which have low content of certain undesirable constituents. Soaps of acids prepared according to the present invention are particularly suitable for use as emulsifying agent in emulsion polymerization of butadiene compounds.

In the emulsion polymerization of butadiene compounds, as for example in the interpolymerization of butadiene with styrene or acrylonitrile to form rubber-like polymers, the emulsifying agent which is employed may be a material comprising soaps of petroleum naphthenic acids. There are certain requirements which petroleum naphthenic acids must meet in order for their soaps to be suitable for such use in emulsion polymerization. One of these requirements is that the acids should have a low content of certain impurities which are believed to be phenolic compounds and which have an inhibitory effect on the polymerization reaction. The present invention provides an improved manner for obtaining petroleum naphthenic acids having sufficiently low content of such impurities to be an unusually good emulsifying agent for use in emulsion polymerization of butadiene compounds.

Previously various methods have been employed for separating petroleum naphthenic acids from petroleum phenols. For example, it is known to partially acidify a mixture of petroleum naphthenates and petroleum phenolates in order to selectively acidify the phenols and thereby obtain an aqueous layer containing the naphthenates in concentrated form and a nonaqueous layer containing phenols in concentrated form. This procedure is based upon the principle that the phenols are, in general, weaker acids than the naphthenic acids and are therefore more readily liberated from a soap mixture by acidification. Another separation method based upon the same principle involves partially saponifying a mixture of phenols and naphthenic acids in order to selectively saponify the naphthenic acids. In the above methods the degree of separation which can be obtained between phenols and naphthenic acids is not sufficiently great to prepare, from most naphthenic acid stocks, naphthenates which are competitive with other known emulsifying agents for use in emulsion polymerization of butadiene compounds. According to the present invention a method of separating phenols from petroleum naphthenic acids is provided, which method is capable of preparing naphthenic acids whose naphthenates are superior emulsifying agents for use in such polymerizations.

According to the present invention petroleum naphthenic acids containing a minor proportion of petroleum phenols are contacted with a phosphorus-containing reagent selected from the group consisting of phosphorus oxyhalides and phosphorus thiohalides, in order to obtain products including unreacted naphthenic acids and a relatively nonvolatile reaction product of the phosphorus-containing reagent with petroleum phenols, and recovering unreacted naphthenic acids from the products, for example by distillation under vacuum. Any suitable temperature, preferably below about 250° C., can be used in the contacting; the reaction of, for example, phosphorus oxychloride with the phenols will occur at room temperature, but preferably the reaction is conducted at somewhat elevated temperature, for example 50–150° C., in order to insure a suitably complete reaction of the phenolic materials contained in the naphthenic acids. It is believed that the reaction of phosphorus-containing reagents from the group specified above with the petroleum phenols results in the formation of compounds of the phenyl phosphate type. At any rate, the reaction products which are obtained have low volatility and the unreacted naphthenic acids can be distilled from the reaction product mixture to obtain a distillate which has high purity and is sufficiently free from phenolic compounds to be exceptionally suitable for use, in the form of alkali metal soaps of the acid, as emulsifying agents in emulsion polymerization of butadiene compounds.

The amount of phosphorus-containing reagent which is contacted with naphthenic acids according to the invention is preferably at least a stoichiometric amount, i. e. one mole of such reagent per three moles of petroleum phenols contained in the naphthenic acids. A greater than stoichiometric amount can be used if desired, since the phosphorus-containing reagent can be removed from the reaction products by washing with water or, in the case of most of the reagents employed according to the invention, can be distilled from the reaction products at a temperature low enough to avoid reaction of phosphorus-containing reagent with naphthenic acids.

The naphthenic acids which are treated according to the present invention can be any suitable naphthenic acid fraction recovered from petroleum. They can be either high molecular weight naphthenic acids corresponding in boiling point to lubricating oil fractions of petroleum, or they can be relatively low molecular weight acids corresponding in boiling point to kerosene, gas oil, etc., fractions of petroleum. The lower molecular weight naphthenic acids generally provide better soaps for use in emulsion polymerization than the relatively high molecular weight naphthenic acids, since polymerizations with the lower molecular weight soaps are generally relatively more rapid, but the high molecular weight acids can be substantially improved for such use by vacuum distillation to obtain a distillate having lower molecular weight than the charge to the distillation.

Various methods can be used to separate naphthenic acids from petroleum. For example, one method involves saponifying crude petroleum or topped crude petroleum, distilling lubricating oil from the saponified oil by vacuum distillation, and recovering naphthenic acids from the vacuum distillation residue. This recovery can be accomplished, for example, by the solvent extraction method disclosed in copending application, Serial No. 144,917 of Earl M. Honeycutt, or by the process described in U. S. Patent No. 2,056,913 to Hasson T. Terrell et al., in which process the vacuum distillation residue is acidified and the acidified residue is vacuum distilled to recover a distillate containing naphthenic acids in concentrated form. Another method for separating naphthenic acids involves distillation of unsaponified crude or topped crude and contacting the evolved vapors with caustic soda to obtain naphthenates in caustic solution by reaction of naphthenic acids in the vapors with the caustic soda. Another method is that wherein petroleum distillates are contacted in liquid phase with caustic soda to obtain caustic sludge containing naphthenates and phenolates and the caustic sludge is acidified to obtain naphthenic acids.

According to the present invention naphthenic acids obtained by any of the methods described above and containing a minor proportion of petroleum phenols relative to naphthenic acids, are contacted with a phosphorus-containing reagent to remove petroleum phenols. Such contacting can be performed on naphthenic acids from which some of the phenols have been previously separated by prior art methods, e. g. by partial acidification, but preferably naphthenic acids obtained without such previous partial phenol removal are contacted with phosphorus-containing reagent in order to remove the bulk of the phenols in one step.

The method of the present invention is generally superior for separating phenols from naphthenic acids to the previously used partial acidification or partial saponification methods. This is particularly true when the naphthenic acids which are to be dephenolated have relatively low saponification number, for example, below about 200. Acids having relatively low saponification number are relatively weak acids and therefore, the difference in strength between such naphthenic acids and phenols is relatively small so that the partial saponification or acidification is relatively ineffective to separate the phenols from the naphthenic acids. The method of the present invention, on the other hand, is highly effective both with relatively weak naphthenic acids and with relatively strong naphthenic acids.

The following example illustrates the invention:

Naphthenic acids were recovered from petroleum by steps including distilling crude petroleum to obtain a topped crude, saponifying the topped crude with an alkaline material including caustic sludge obtained from caustic treating of gas oil distillates from petroleum, vacuum distilling the saponified oil to obtain lubricating oil fractions, acidifying the vacuum distillation residue and vacuum distilling the acidified residue to obtain a naphthenic acid distillate. This distillate contained substantial quantities of unsaponifiable oil which oil was then removed from the acids by an extraction operation involving saponification of the acids and extraction of the saponified acids, dissolved in aqueous isopropanol, with petroleum naphtha to obtain a naphtha layer containing oil in concentrated form and an aqueous alcohol layer containing deoiled sodium naphthenates. The deoiled naphthenates were acidified to obtain naphthenic acids which were then separated from the aqueous layer and vacuum distilled to obtain a 0–90% distillate fraction having a saponification value of 185.5 and containing a minor proportion of petroleum phenols. This fraction was divided into a first and second portion. The first portion was vacuum distilled to obtain a 0–50% distillate fraction. The second portion, weighing 72 grams, was admixed with 100 cc. of isooctane and 10 cc. of phosphorus oxychloride. This reaction mixture was stirred at a temperature of about 100° C. under refluxing conditions for 2 hours. At the end of this period the reaction product was washed with water to decompose phosphorus oxychloride and remove the decomposition products with the aqueous phase; and isooctane was removed by distillation. The remaining reaction products, containing unreacted naphthenic acids and reaction products of phosphorus oxychloride with phenolic materials, were vacuum distilled to obtain a 0–65% distillate fraction consisting of purified naphthenic acids and boiling between 120° C. at 2 mm. Hg, and 230° C. at 3 mm. Hg. This naphthenic acid fraction was saponified with potassium hydroxide to form the potassium soap thereof, and this potassium soap was compared, in emulsion polymerization of butadiene and styrene, with the potassium soap of the 0–50% fraction of the first portion of naphthenic acid referred to above.

The two potassium soap materials, one prepared from naphthenic acids which had ben dephenolated according to the present invention, and the other prepared from naphthenic acids which were similar except that they had not been dephenolated according to the present invention, were each employed in separate emulsion polymerization experiments involving emulsion polymerization of butadiene and styrene at a closely controlled temperature of 41° F. In each experiment the time required to obtain 60% conversion of butadiene and styrene to solid polymerization products was determined. It was found that the soap prepared from acids which had been dephenolated according to the present invention, provided a polymerization which required about 7 hours less time to effect 60% conversion, than the soap prepared from acids which had not been dephenolated according to the present invention. The respective times required to obtain 60% conversion were as follows:

Time to obtain 60% conversion
Undephenolated acid soaps _____ hours __ 16
Dephenolated acid soaps according to the present invention _____ do____ 9

This example shows that the method of purifying naphthenic acids according to the present invention effects a large improvement in the suitability of soaps of naphthenic acids for use in emulsion polymerization of butadiene compounds. This is evidenced by the fact that, if the purification according to the invention had had no effect, the soaps of undephenolated acids, being a 0–50% distillate, would give more rapid polymerization than the dephenolated acid soaps, which were a 0–65% distillate, since the heavy ends do not provide as rapid polymerization as the lighter constituents. Since, on the contrary, the dephenolated acid soaps gave a much more rapid polymerization than the undephenolated acid soaps, it is clearly seen that the purification according to the present invention had a large effect in improving the acids for use as soaps in emulsion polymerization.

Additional experiments demonstrated that soaps of naphthenic acids which had been prepared by partial acidification and partial saponification techniques, as employed in the prior art, gave polymerizations in which considerably longer time was required to obtain 60% conversion than in polymerizations employing naphthenic acids prepared according to the phosphorus oxychloride treatment according to the present invention.

Although, in the above example phosphorus oxychloride was employed as the phosphorus-containing reagent, it is to be understood that substantially similar results are obtained when other phosphorus oxyhalides are employed, e. g. phosphorus oxybromide, phosphorus oxybromide dichloride, ($POBrCl_2$), phosphorus oxydibromide chloride ($POClBr_2$), phosphorus thiochloride ($PSCl_3$), phosphorus thiobromide ($PSBr_3$), phosphorus thiobromodichloride ($PSBrCl_2$) etc. Preferred reagents for use according to the invention are phosphorus oxychlorides, phosphorus oxybromides, phosphorus thiochlorides, and phosphorus thiobromides, but iodine and fluoride containing reagents can also be used, e. g. phosphorus oxyfluoride and phosphorus oxyiodide.

The invention claimed is:

1. Method for removing phenolic materials from petroleum naphthenic acids which comprises: contacting petroleum naphthenic acids containing a minor proportion of phenolic materials with a phosphorus-containing reagent selected from the group consisting of phosphorus oxyhalides and phosphorus thiohalides, thereby to obtain a product mixture containing petroleum naphthenic acids and reaction products of phenolic material with said reagent; and recovering naphthenic acids from said product mixture.

2. Method for removing phenolic materials from petroleum naphthenic acids which comprises: contacting petroleum naphthenic acids containing a minor proportion of phenolic materials with phosphorus oxychloride to obtain a product mixture containing petroleum naphthenic acids and reaction products of phenolic materials with said phosphorus oxychloride; and recovering petroleum naphthenic acids from said product mixture.

3. Method according to claim 2 wherein said contacting is performed at a temperature within the approximate range 50–150° C., and wherein the materials present during said contacting initially consist essentially of said acids, said reagent, and a solvent.

4. Method according to claim 2 wherein said petroleum naphthenic acids are distilled from said product mixture.

5. Method for preparing petroleum naphthenates suitable for use in emulsion polymerization of butadiene compounds which comprises: recovering from petroleum, naphthenic acids having saponification value less than 200 and containing a minor proportion of phenolic materials; contacting said acids with phosphorus oxychloride at a temperature within the approximate range 50–150° C. to obtain a product mixture containing petroleum naphthenic acids and reaction products of phenolic materials with said phosphorus oxychloride, the materials present during said contacting initially consisting essentially of said acids, phosphorus oxychloride, and a solvent; and vacuum distilling said product mixture to obtain a naphthenic acid distillate; and saponifying said distillate to obtain petroleum naphthenates.

References Cited in the file of this patent

UNITED STATES PATENTS

| | | |
|---|---|---|
| 554,938 | Lederer | Feb. 18, 1896 |
| 1,425,393 | Laska et al. | Aug. 8, 1922 |
| 1,869,312 | Granger | July 26, 1932 |
| 2,240,034 | Caplan | Apr. 29, 1941 |
| 2,288,281 | Huijser et al. | June 30, 1942 |
| 2,450,903 | Mikeska | Oct. 12, 1948 |

FOREIGN PATENTS

| | | |
|---|---|---|
| 390,847 | Germany | Feb. 23, 1924 |
| 573,479 | Great Britain | Nov. 22, 1945 |